United States Patent

Korsgaard

[11] Patent Number: 5,441,083
[45] Date of Patent: Aug. 15, 1995

[54] INSULATION SYSTEM FOR CONDUIT OR CONTAINER WHEREIN INNER AND OUTER WATER-ABSORBING LAYERS CONNECT THROUGH SLOT IN INTERMEDIATE HEAT-INSULATING LAYER

[75] Inventor: Vagn Korsgaard, Horsholm, Denmark

[73] Assignee: Hygrowick-International APS, Horsholm, Denmark

[21] Appl. No.: 945,983
[22] PCT Filed: May 14, 1991
[86] PCT No.: PCT/DK91/00132
§ 371 Date: Nov. 4, 1992
§ 102(e) Date: Nov. 4, 1992
[87] PCT Pub. No.: WO91/18237
PCT Pub. Date: Nov. 28, 1991

[30] Foreign Application Priority Data
May 14, 1990 [DK] Denmark .............. 1192/90

[51] Int. Cl.6 .................................... F16L 9/14
[52] U.S. Cl. .................. 138/149; 138/147; 138/151
[58] Field of Search ........... 138/147, 151, 152, 156, 138/167, 149; 122/494

[56] References Cited

U.S. PATENT DOCUMENTS

| | | | |
|---|---|---|---|
| 278,559 | 5/1883 | Kelly | 138/152 |
| 775,537 | 11/1904 | McConnell | 138/152 |
| 1,613,725 | 1/1927 | Sabin | 138/149 |
| 2,841,203 | 7/1958 | Gronemeyer | 138/149 |
| 2,930,407 | 3/1960 | Conley et al. | 138/149 |
| 2,949,953 | 8/1960 | Di Maio et al. | 138/149 |
| 4,130,140 | 12/1978 | Cerny et al. | 138/149 |
| 4,745,760 | 5/1988 | Porter . | |
| 4,921,018 | 5/1990 | Dridi et al. | 138/149 |
| 5,005,531 | 4/1991 | Nelson | 138/149 |

FOREIGN PATENT DOCUMENTS

| | | | |
|---|---|---|---|
| 87317 | 5/1959 | Denmark . | |
| 3050528 | 2/1983 | Germany | 138/149 |
| 38172 | 10/1923 | Norway | 138/149 |
| 123644 | 12/1948 | Sweden . | |
| 181327 | 12/1935 | Switzerland . | |
| 197708 | 9/1977 | U.S.S.R. | 138/149 |

OTHER PUBLICATIONS

International Publication No. WO 89/12199, dated Dec. 14, 1989 to William Fairfull.
Dialog Info. Services, File 351, World Patent Index 18–91, Dialog Accession No. 007097054, Mitsubishi Plastics Ind., JP 62044421 of Feb. 26, 1987.

Primary Examiner—James E. Bryant, III
Attorney, Agent, or Firm—Watson, Cole, Grindle & Watson

[57] ABSTRACT

An insulation system for a cold pipe or container includes an inner water-absorbing layer, an intermediate heat-insulating layer defining a slot therethrough, and an outer water-absorbing layer, the inner and outer layers being in contact through the slot.

4 Claims, 3 Drawing Sheets

INSULATION SYSTEM FOR CONDUIT OR CONTAINER WHEREIN INNER AND OUTER WATER-ABSORBING LAYERS CONNECT THROUGH SLOT IN INTERMEDIATE HEAT-INSULATING LAYER

BACKGROUND OF THE INVENTION

1. Field of the Invention

The present invention relates to an insulation system for a conduit or container having a surface temperature below the dew point of the ambient air and comprising an inner layer, a heat-insulating layer located on the exterior side of the inner layer and an outer layer located on the exterior side of the heat-insulating layer. In particular the invention relates to an insulating system for insulating cold pipes and conduits and containers for the transportation or storage of cooling media.

2. The Prior Art

It is well-known to insulate hot water pipes by mounting thereon a tubular insulation comprising axially slotted tubular insulating elements. Such tubular insulations are readily mounted and they are effective for preventing loss of heat from the heating pipes.

If such tubular insulations are used in connection with cold pipes, moisture inevitably penetrates through the insulation by diffusion and gets into contact with the surface of the cold pipe. If the surface temperature is below the dew point of the ambient air, condensation of water vapour on the cold pipe will occur and thereby the insulation material becomes moist and loses its insulating capacity. Furthermore, the insulating material may decompose and the cold pipe may corrode.

The removal of moisture from the insulating material normally takes place very slowly as conventional insulation materials have little capillary effect.

The result is that the tubular insulation remains moist.

The exterior surface of such tubular insulations are usually covered by a layer of a vapour-proof material, such as an aluminium foil or a plastic film, in order to slow down the moistening of the insulating material.

However, experience shows that unavoidable flaws in the vapour-proof foil or film result in severe moistening of the insulating material over the years, and unfortunately in this situation the vapour-proof layer will prevent drying of the heat-insulating layer by capillary suction.

Up to now the only solution to this problem has been periodic replacement of the wet insulation.

SE-C-123644 discloses an insulating system comprising an inner sealing layer, e.g. consisting of asphalt, a heat-insulating layer composed of adjacent elements of trapezoidal cross-section and located on the exterior side of the inner layer and an outer sealing layer, e.g. consisting of asphalt.

It is the object of the invention to provide an insulation system for conduits and containers of the above-mentioned type which instead of preventing water vapours from entering the insulation system, ensures that moisture present therein is continuously removed therefrom.

SUMMARY OF THE INVENTION

This object is obtained with the insulation system according to the invention wherein both the inner layer and the outer layer are water absorbing and are in mutual contact through an opening in the heat-insulating layer, such that water can be transported from the inner layer to the outer layer by capillary suction.

When condensation occurs on the exterior side of the conduit or container, the capillary suction will cause the condensed water to be sucked out by the outer layer of water-absorbing material and to evaporate from the latter layer.

If the insulation material used has a high water vapour permeability, such as mineral wool, the insulation system of the invention preferably further comprises a diffusion-proof layer provided on the exterior side of the heat-insulating layer within the outer water-absorbing layer and having an opening formed therein.

In this embodiment of the invention the diffusion-proof layer will provide a desired high degree of resistance to the diffusion of water vapour from the surroundings and towards the relatively cold surface of the conduit or container.

However, if the insulation material has a low water-vapour permeability, such a diffusion-proof layer may be omitted.

When the opening in the heat insulating layer is in the form of an axially-extended slot, the two layers of water-absorbing material preferably are integral and preferably the outer layer consists of two parts which extend in opposite directions from the slot. Such insulation is particularly simple to construct on, e.g., straight cold pipes, the only steps required being to place the absorbing layer, e.g., in the form of a piece of felt, on the pipes with its ends in an extending position, and to place tubular insulation elements optionally having a diffusion-proof surface layer around the pipe and then to fold the two free ends of the water-absorbing layer away from the slot and optionally attach these ends to the exterior side of the heat-insulating layer or the diffusion-proof layer.

A preferred embodiment of the insulation system of the invention further comprises a layer of a diffusion-proof material located externally of the outer layer of water-absorbing material and overlapping the opening in the heat-insulating layer.

The extent to which the layer of diffusion-proof material covers the outer layer of water-absorbing material determines the vapour diffusion resistance of the insulation system.

If the opening in the heat insulating layer is an axially-extending slot in the heat-insulating layer, a suitable diffusion resistance is generally obtained if the outer diffusion-proof layer extends a few centimeters perpendicularly to the slot.

The layers of water-absorbing material are preferably fibre layers consisting of glass, organic synthetic or natural fibres. An example of a suitable fibre material is a non-woven fabric of hydrophilic synthetic fibres, such as nylon or polypropylene felt having a weight of from 20 to 150 g/m$^2$.

The layer of water-absorbing material may fully surround the heat-insulating layer, but this is not necessary if only its free (not covered) surface is sufficiently large to permit effective evaporation of the condensed water absorbed by the part of the layer which is located on the exterior side of the heat-insulating layer.

The heat-insulating material may consist of known insulating materials, such as mineral wool and foamed plastic.

In the insulation of pipes, a special tubular mineral wool product having a thin, integral inner layer of mineral wool, which has been made water-absorbing, may be used as a combined water absorbing layer and heat-insulating layer. The inner layer, which, e.g., has a thickness of from 1 to 3 mm, can be made water absorbing during the manufacturing process by increasing the temperature of the inner layer above the temperature at which the water-repellant fibre binder decomposes.

The diffusion-proof layer on the exterior side of the heat insulating layers may conveniently be of a plastic film or a metal foil, e.g., an aluminium foil.

Another preferred embodiment of the insulation system according to the invention comprises a plastic film having one portion for winding around a conduit and another portion which is adapted to extend out through a slot in the heat-insulating layer so as to form a diffusion-proof layer on the exterior side of the heat insulating layer and on the exterior side of the outer water-absorbing layer in the slot zone. By placing such diffusion-proof layer in direct contact with the conduit the risk of corrosion is reduced.

The outer diffusion-proof layer is preferably a plastic film which can be adhered directly to the exterior side of the outer layer of the water absorbing material.

A coat of paint which is open to diffusion may the applied to the exterior side of the latter layer.

The invention also relates to a process for providing a conduit or container with an insulation as described above. This process is characterized in placing an inner layer of a water-absorbing material on the exterior side of the conduit or container, placing a heat-insulating layer comprising an opening therein in contact with the exterior side of the inner layer of water-absorbing material, placing a water-absorbing material in the opening and placing an outer layer of a water-absorbing material on the exterior side of the heat-insulating layer.

If the insulation material used has a high water vapour permeability, such as mineral wool, a diffusion-proof layer having an opening formed therein is preferably placed on the exterior side of the heat-insulating layer within the outer water-absorbing layer.

In a preferred embodiment of the process of the invention a layer of diffusion-proof material is placed on the exterior side of the outer layer of water-absorbing material in the region outside the opening in the heat-insulating layer.

In another preferred embodiment of the process according to the invention, a diffusion-proof layer, such as a plastic film, is placed in direct contact with the exterior surface of the conduit or container, thereby preventing condensed water, if any, from getting into direct contact with the surface and provoking corrosion.

A particularly simple embodiment for providing a cold pipe with an insulation comprises the steps of wrapping a laminate of a plastic film and a felt around the pipe with the plastic film being proximate to the cold pipe, placing a tubular insulation provided with an axially-extending slot around the pipe in such a manner that the laminate extends out through the slot, wrapping the protruding part of the laminate around the heat-insulating layer and positioning the plastic film in contact with the exterior side of the tubular insulation. The laminate may be positioned so that at least the plastic film overlaps the slot in the tubular insulation.

Instead of using a laminate a separate plastic film and a separate water-absorbing layer may be used.

BRIEF DESCRIPTION OF THE DRAWINGS

The invention will now be described in further detail with reference to the accompanying drawings wherein.

DETAILED DESCRIPTION OF THE PREFERRED EMBODIMENTS

Figure 1:
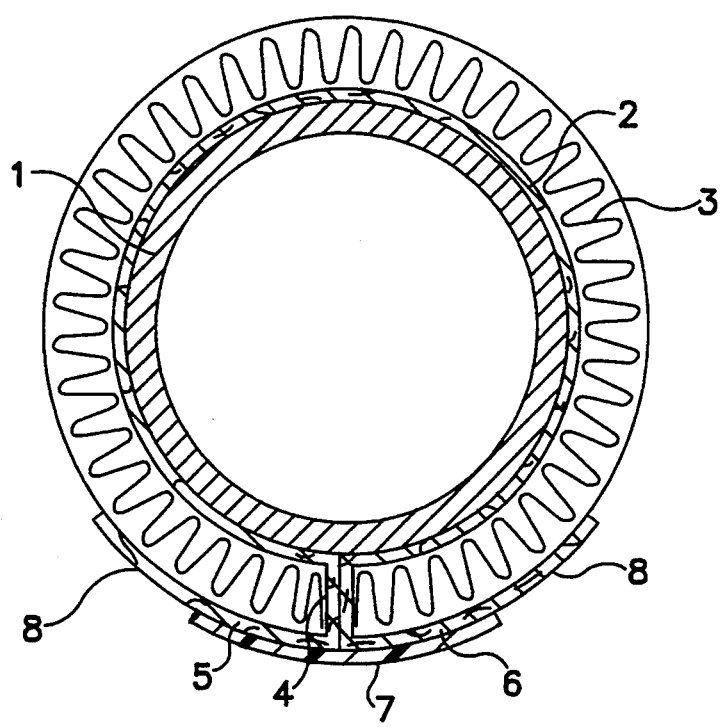
FIG. 1 is a schematic cross-sectional view of a pipe comprising a preferred embodiment of an insulation according to the invention.

FIG. 1 shows a cold pipe 1 surrounded by a felt layer 2 which is surrounded by a layer 3 of a heat-insulating layer having a low water vapour permeability, such as a synthetic foam with closed cells. The heat-insulating layer 3 comprises an axially extending slot 4, and parts 5,6 of the felt layer 2 extend through the slot 4 and are placed parallel to the outer surface of the heat-insulating layer 3. A plastic film 7 is adhered to the exterior side of the parts 5,6 in the region outside the slot 4, this plastic film 7 extending to both sides of the slot 4, but not far enough to cover the parts 5,6 completely. Thus a free (not covered) surface 8 is formed on the parts 5,6 from which evaporation of water may take place.

Figure 2:
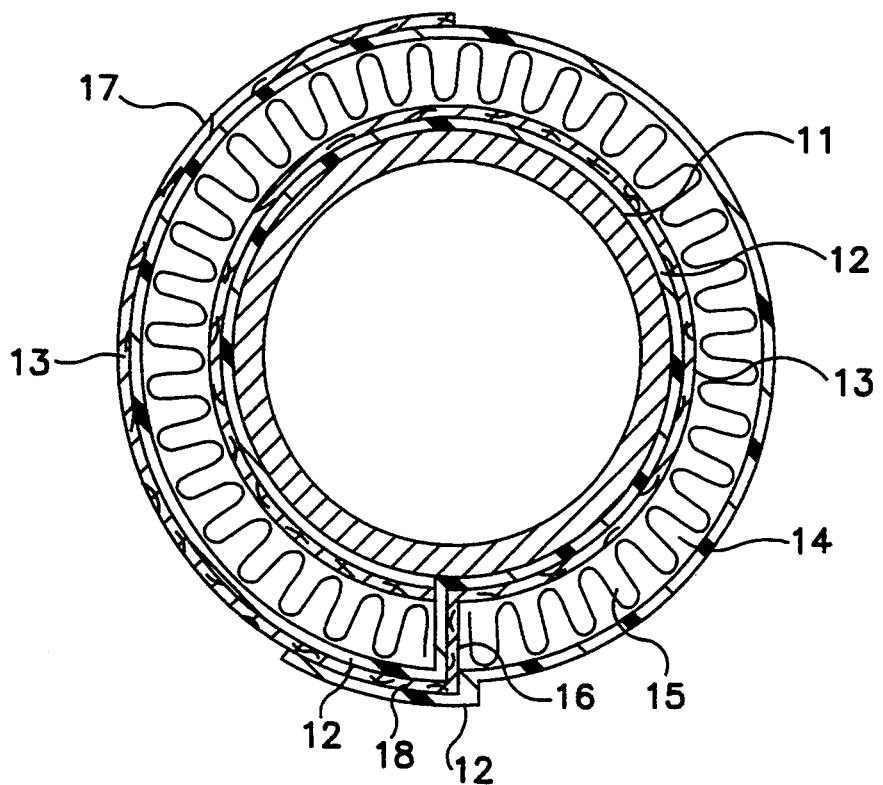
FIG. 2 is a schematic cross-sectional view of a pipe comprising an alternative preferred embodiment of the insulation according to the invention.

In FIG. 2 11 denotes a cold pipe. The pipe 11 is surrounded by a laminate comprising a plastic film 12 and a water-absorbing felt layer 13. The laminate is placed within a tubular insulation 14 consisting of a mineral fibre layer 15. The tubular insulation is provided with an axially extending slot 16 and part of the laminate extends out through this slot and is wrapped around the tubular insulation in such a manner that the plastic film 12 overlaps itself in the region outside the slot 16, whereas the water-absorbing felt layer 13 extends over only part of the periphery of the pipe so as to form a zone 17 having a free (not covered) surface through which evaporation may take place and a zone 18 located between the overlapping parts of the plastic film 12.

Alternatively, the laminate may be wrapped all around the tubular insulation so as to overlap itself in the region outside the slot 16.

For condensation of water vapour contained in the ambient air to occur, the water vapour must diffuse through the felt layers 2,13. This diffusion route is relatively long and only a limited condensation will ordinarily occur on the exterior surface of the pipe 1 or on that part of the plastic film 12 which is in contact with the pipe 11.

Condensed water will be sucked out from the part of the felt layer 2,13 surrounding the pipe and through the slot 4,16 to that part of the felt layer 5,6,13 which is located on the exterior side of the insulating layer 3,14 due to the capillary suction prevailing in the felt layer 2,13 and will evaporate from the regions which are not covered by the plastic film 7,12.

When the pipe to be insulated has an outer surface temperature below the freezing point of water, the condensed water will freeze to form ice.

The embodiments of the invention shown in FIGS. 1 and 2 can be used to isolate cold pipes having an outer surface temperature of below 0° C., provided the pipe temperature is, at intervals, raised to a level above 0° C., e.g., in connection with maintenance routines.

Figure 3:
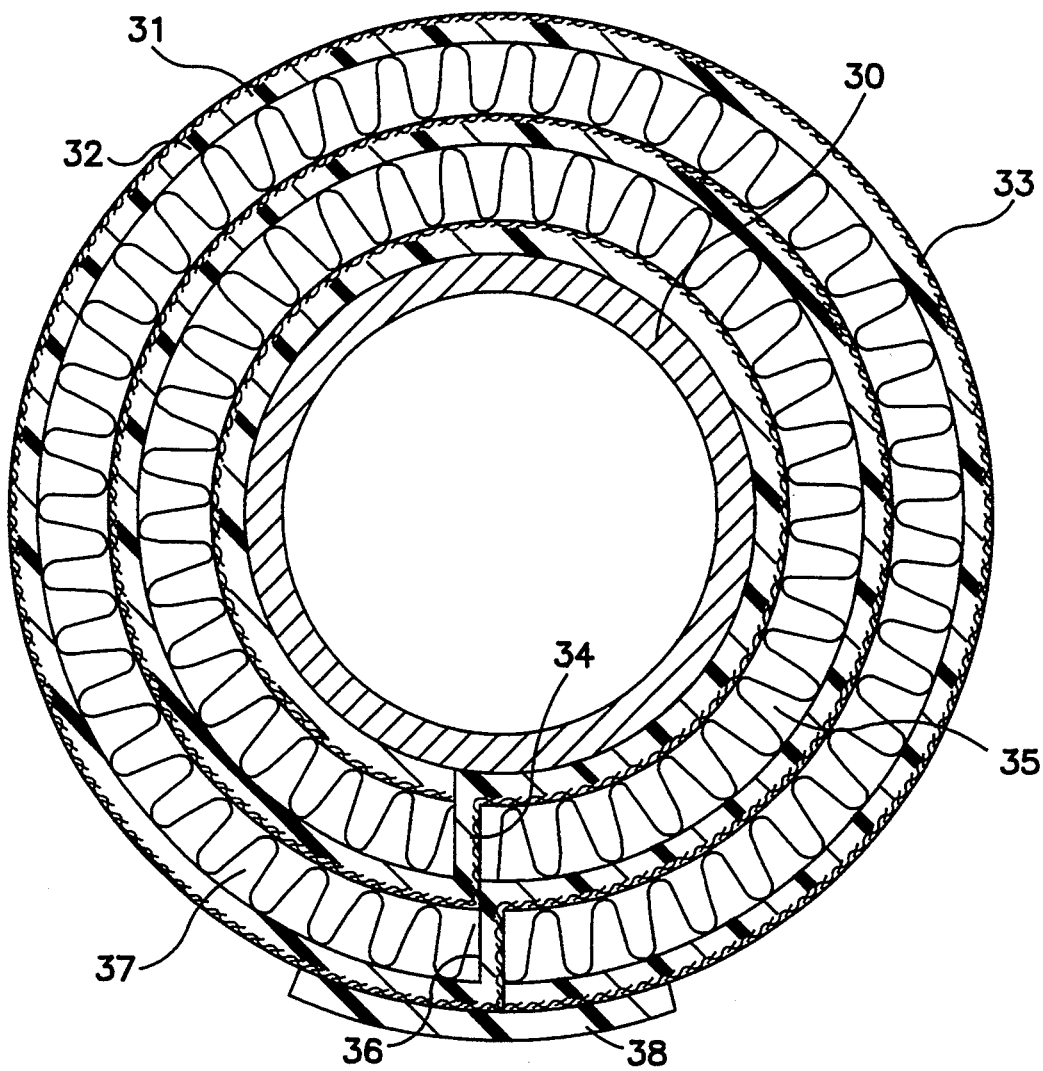
FIG. 3 is a schematic cross-sectional view of a pipe for the transportation of a liquid having a temperature of below 0° C. comprising a preferred embodiment of an insulation according to the invention.
Figure 4:
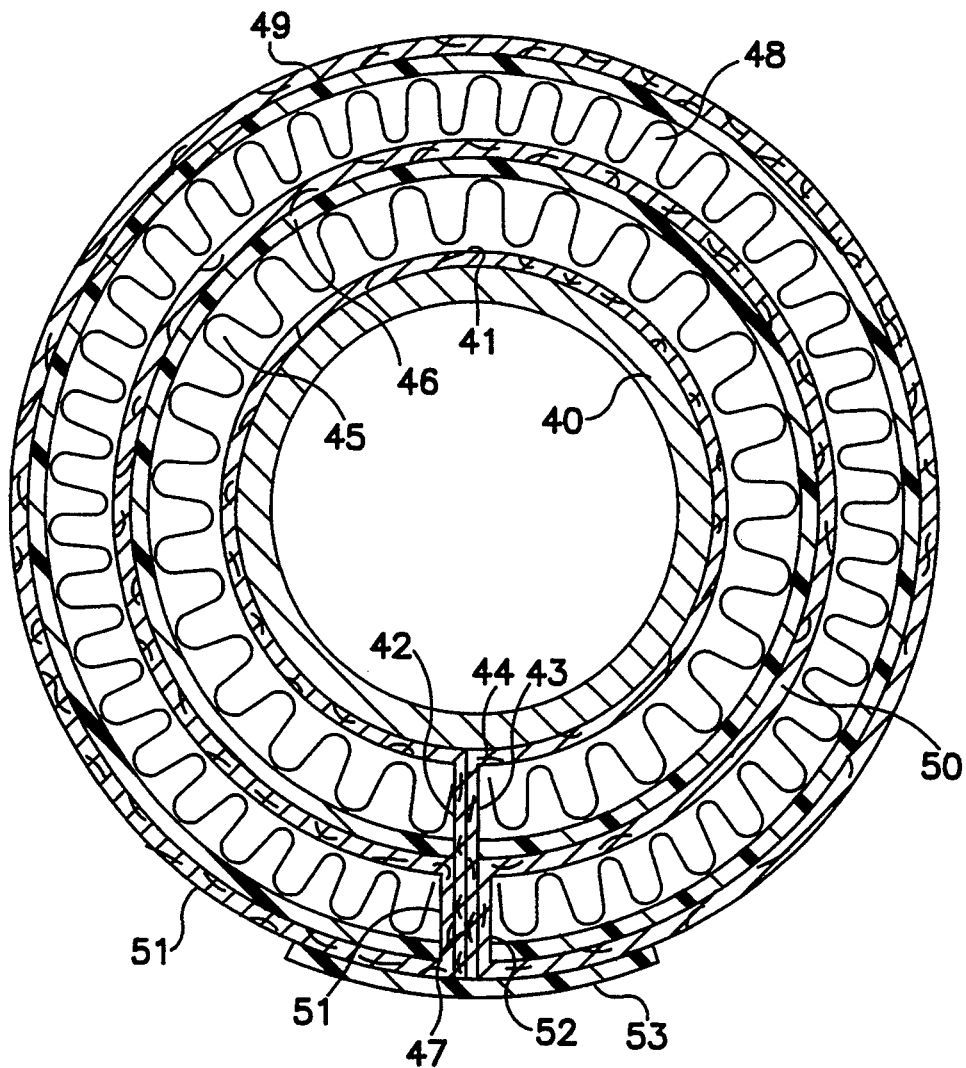
FIG. 4 shows a schematic cross-sectional view of a pipe for the transportation of a liquid having a temperature of 0° C. comprising an alternative preferred embodiment according to the invention.

In FIGS. 3 and 4 embodiments of the invention are shown which are particularly suitable for insulating pipes having an outer surface temperature of below 0° C., e.g. below −5° C.

FIG. 3 shows a pipe 30 which is surrounded by a laminate 31 comprising a plastic film 32 and a layer of water-absorbing material 33.

The laminate 31 is wrapped around the pipe 30 with the plastic film 32 located adjacent to the surface of the pipe 30. The laminate extends out through an axially-extending slot 34 in a first layer 35 of a heat-insulating material and around this layer and also out through an axially-extending slot 36 in a second layer 37 of a heat insulating material.

The laminate 31 also surrounds the second layer 37 of heat-insulating material and ends in proximity to the slot 36. The region outside the slot 36 is covered by an axially-extending plastic film strip 38.

FIG. 4 shows a pipe 40 which is surrounded by a layer of water-absorbing material 41. Parts 42,43 of the water-absorbing layer 41 extend out through an axially-extending slot 44 in a first layer 45 of a heat insulating material having a plastic film 46 fixed to its exterior side and also out through an axially-extending slot 47 in a second layer 48 of a heat-insulating material having a plastic film 49 fixed to its exterior side.

The combination of the first heat-insulating layer 45 and the plastic film 46 is surrounded by a second water-absorbing layer 50 having parts 51,52 extending out through the slot 47 in the second heat-insulating layer 48.

The part 51 is wrapped around the plastic film 49 of the second heat-insulating layer 48, while parts 42,43 and 52 may be cut off at the exterior end of the slot 47.

The region outside the slot 47 is covered by an axially-extending adhesive tape 53 open to water vapour diffusion and extending to both sides of the slot 47. This adhesive tape 53 serves to keep the insulation system together.

The part 51 of the second water-absorbing layer 50 need not be wrapped all around the second heat-insulating layer 48, but may e.g. only extend 1–10 cm outside the adhesive tape, depending on the pipe diameter, to form a sufficient evaporation area to prevent dripping.

In the insulation systems shown in FIGS. 3 and 4 the first heat-insulating layer 35,45 serves to maintain the surface of the layer at a temperature above 0° C., e.g. 1° C., and the water-absorbing layer which is located within the second heat-insulating layer 37,48 serves to remove water which may have been accumulated in the zone between the pipe 30,40 and the heat-insulating layer 37,48 in the form of ice during periods when the temperature at the surface of the pipe raises to above 0° C. The water removed in such periods as well as water formed by condensation in the zone between the first and second layers of heat-insulating material migrate to the surface of the insulation from which it is evaporated.

I claim:

1. The combination of a conduit or container having a surface temperature below the dew point of surrounding air and an insulation system comprising an inner water-absorbing layer in contact with the surface of the conduit or container, a heat-insulating layer located on an exterior side of the inner layer and defining an opening therethrough, and an outer water-absorbing layer, the inner and outer water-absorbing layers being in mutual contact through the opening in the heat-insulating layer such that water absorbed by the inner layer can be transported from the inner layer to the outer layer by capillary suction.

2. The combination according to claim 1, wherein said insulation system includes a layer of diffusion proof material located externally of the outer layer of water-absorbing material and overlapping the opening in the heat-insulating layer.

3. The combination according to claim 1, wherein said opening in the heat-insulating layer of the insulating system is an axially-extending slot, wherein the two layers of water-absorbing material are integral, and wherein the outer layer consists of two parts which extend in opposite directions from the slot.

4. The combination according to claim 3, wherein the insulating system includes an outer diffusion-proof layer on the exterior side of the outer water-absorbing layer and overlying said slot.

* * * * *